(12) United States Patent
Lee et al.

(10) Patent No.: US 9,233,469 B2
(45) Date of Patent: Jan. 12, 2016

(54) ROBOTIC SYSTEM WITH 3D BOX LOCATION FUNCTIONALITY

(71) Applicant: GM GLOBAL TECHNOLOGY OPERATIONS LLC, Detroit, MI (US)

(72) Inventors: Moonju Lee, Suwon (KR); Jianying Shi, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 50 days.

(21) Appl. No.: 14/179,968

(22) Filed: Feb. 13, 2014

(65) Prior Publication Data
US 2015/0224648 A1 Aug. 13, 2015

(51) Int. Cl.
*B25J 9/16* (2006.01)
*G06N 99/00* (2010.01)

(52) U.S. Cl.
CPC ............. *B25J 9/1697* (2013.01); *G06N 99/005* (2013.01); *Y10S 901/47* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,402,053 A * | 8/1983 | Kelley | ................... | B23P 19/004 414/730 |
| 5,579,444 A * | 11/1996 | Dalziel | ................... | B25J 9/1697 382/153 |
| 5,856,844 A * | 1/1999 | Batterman | ............... | G01S 5/163 345/158 |
| 6,163,946 A * | 12/2000 | Pryor | ................... | A01B 69/008 29/407.04 |
| 6,167,607 B1 * | 1/2001 | Pryor | ................... | A01B 69/008 29/407.04 |
| 6,297,844 B1 * | 10/2001 | Schatz | ............... | G06K 9/00771 348/152 |
| 7,995,096 B1 * | 8/2011 | Cressy | ............. | G08B 13/19691 348/143 |
| 8,380,349 B1 * | 2/2013 | Hickman | ............. | G05D 1/0246 700/247 |
| 8,639,644 B1 * | 1/2014 | Hickman | ............... | G05B 9/418 700/245 |
| 8,965,104 B1 * | 2/2015 | Hickman | .................. | G06T 7/00 382/153 |
| 2007/0069026 A1 * | 3/2007 | Aoyama | .............. | G06K 7/1456 235/462.09 |
| 2007/0150228 A1 * | 6/2007 | Fukumoto | .......... | G01B 11/2518 702/155 |
| 2009/0323121 A1 * | 12/2009 | Valkenburg | .......... | G01B 11/002 358/1.18 |
| 2010/0103106 A1 * | 4/2010 | Chui | ....................... | G06F 3/017 345/166 |

(Continued)

FOREIGN PATENT DOCUMENTS

| AT | 507339 A1 | 4/2010 |
|---|---|---|
| DE | 19805794 A1 | 8/1998 |

(Continued)

*Primary Examiner* — Jonathan L Sample
(74) *Attorney, Agent, or Firm* — Quinn Law Group, PLLC

(57) ABSTRACT

A robotic system includes a robot, a three-dimensional (3D) point cloud camera, and a controller. The camera outputs an image data file having two-dimensional (2D) color data and 3D depth data. The controller receives input criteria and the image data file, and detects 2D and 3D line segments in the image data file. Sets of new 3D lines are generated via back-projecting some of the 2D line segments onto some of the 3D line segments. The new 3D lines are grouped into intersecting lines, and the controller performs a normal vector grouping function on the intersecting lines to identify candidate planes. Intersecting planes are identified from the candidate planes, and candidate boxes are identified from the intersecting planes. The controller locates a target box from among the identified candidate boxes via the input criteria. A control action may be commanded on the target box by the end effector.

14 Claims, 2 Drawing Sheets

(56) References Cited

U.S. PATENT DOCUMENTS

| | | | | |
|---|---|---|---|---|
| 2010/0166294 | A1* | 7/2010 | Marrion | G06K 9/6211 382/154 |
| 2010/0328682 | A1* | 12/2010 | Kotake | G06T 7/0057 356/620 |
| 2013/0100282 | A1* | 4/2013 | Siercks | G01B 11/2513 348/135 |
| 2013/0108116 | A1* | 5/2013 | Suzuki | G01C 11/04 382/106 |
| 2013/0114861 | A1* | 5/2013 | Takizawa | G06T 7/0044 382/106 |
| 2013/0121592 | A1* | 5/2013 | Fujiki | G01B 11/002 382/195 |
| 2013/0158711 | A1* | 6/2013 | Smith | B25J 9/1694 700/259 |
| 2013/0257748 | A1* | 10/2013 | Ambrus | G06F 3/04883 345/173 |
| 2013/0271577 | A1* | 10/2013 | Watanabe | G06T 7/0046 348/46 |
| 2013/0272578 | A1* | 10/2013 | Watanabe | G06T 7/0046 382/103 |
| 2013/0321586 | A1* | 12/2013 | Kirk | G06T 15/04 348/47 |
| 2013/0346348 | A1* | 12/2013 | Buehler | B25J 9/0087 706/12 |
| 2014/0063204 | A1* | 3/2014 | Siercks | G01B 11/2545 348/50 |
| 2014/0067317 | A1* | 3/2014 | Kobayashi | B25J 9/1697 702/153 |
| 2014/0267619 | A1* | 9/2014 | Bridges | G01S 17/003 348/46 |
| 2014/0354528 | A1* | 12/2014 | Laughlin | G06F 3/011 345/156 |
| 2014/0354529 | A1* | 12/2014 | Laughlin | G06F 3/017 345/156 |

FOREIGN PATENT DOCUMENTS

| | | |
|---|---|---|
| DE | 102006036346 A1 | 2/2008 |
| DE | 102007008598 A1 | 8/2008 |
| DE | 102007026956 A1 | 12/2008 |
| DE | 102008020579 A1 | 11/2009 |

* cited by examiner

ROBOTIC SYSTEM WITH 3D BOX LOCATION FUNCTIONALITY

TECHNICAL FIELD

The present disclosure relates to a robotic system with three-dimensional (3D) box location functionality.

BACKGROUND

Robots are electromechanical devices capable of performing complicated or repetitive tasks in an automated manner. A typical robot moves on multiple axes in response to task instructions and sensory feedback. For instance, a robot may use various proximity sensors, tactile sensors, switches, load cells, transducers, and the like to evaluate its surrounding environment in the execution of a given work task. The robot may act on an object located within its environment via one or more end effectors.

Material handling robots in particular may be programmed to locate, select, and move objects in an automated work environment. For example, in a typical manufacturing facility, such robots may be used to perform repetitive kitting operations in which components are packaged in boxes. Therefore, in a kitting operation a robot must first locate a target box, identify a part or component located within the box, and then execute an end effector control sequence to act on the identified component in a given manner.

SUMMARY

A robotic system is disclosed herein that includes a robot, e.g., a material handling robot having an end effector. The robotic system also includes one or more three-dimensional (3D) point cloud cameras, also referred to as red, green, blue depth (RGB-D) cameras, and a controller in communication with the robot and the camera(s). Each camera images a target object via collection of a 3D point cloud of depth information and two-dimensional (2D) red, blue, green (RGB) color data, and outputs an auto-synchronized data file with the 2D color data and the 3D depth data. The controller, which may be embodied as a computer device having a processor and tangible, non-transitory memory, is programmed or otherwise configured to automatically fuse the 2D and 3D information from the camera, and to thereafter segment planes and lines in the fused information at various image depths so as to locate a possible/candidate box in the workspace of the robot and identify its position and orientation. If the candidate box matches known parameters of target box, i.e., a box having known dimensions and/or color characteristics, the controller executes a control action with respect to the target box. Example control actions may include commanding a grasping and/or moving of the target box and/or a component located therein by an end effector of the robot via control commands transmitted to the robot.

In a particular embodiment, a robotic system includes a robot having an end effector, a three-dimensional (3D) point cloud camera, and a controller. The camera is operable to collect and output a data file having two-dimensional (2D) color data and 3D point cloud depth data. The controller, which is in communication with the 3D point cloud camera and the robot, includes a processor and memory on which is recorded instructions for locating a target box. Execution of the instructions by the processor causes the controller to receive the data file from the 3D point cloud camera, and also a set of input criteria. The controller detects a plurality of 2D line segments and a plurality of 3D line segments in the received data file, and generate a set of 3D lines, including back-projecting at least some of the 2D line segments onto at least some of the plurality of 3D line segments. The controller also groups the generated set of 3D lines into groups of intersecting lines, performs a normal vector grouping (NVG) function on the groups of intersecting lines to thereby identify a set of possible/candidate planes, and identifies sets of intersecting planes from the set of candidate planes. Possible/candidate boxes are then identified from the sets of intersecting planes, and the controller locates a target box from among the identified candidate boxes via the received input criteria. The controller is also configured to command execution of a control action on the target box by the end effector of the robot.

A method for use with the robotic system includes receiving a set of input criteria via a controller of the robotic system, and receiving, via the controller, an image data file from a point cloud camera of the robotic system. The image data file includes 2D color data, typically described as red, green, blue (RGB) data, and 3D depth data. The method also includes detecting a plurality of 2D line segments and a plurality of 3D line segments in the received data file, generating a set of 3D lines, including back-projecting at least some of the 2D line segments onto at least some of the 3D line segments, and grouping the generated set of 3D lines into groups of intersecting lines. Additionally, the method entails performing an NVG function on the groups of intersecting lines to identify a set of candidate planes, identifying sets of intersecting planes from the set of candidate planes, and identifying candidate boxes from the sets of intersecting planes. Thereafter, the method proceeds by locating a target box from among the identified candidate boxes via the input criteria, and includes commanding, via the controller, an execution of a control action on the target box by an end effector of a robot of the robotic system.

In another embodiment, the robotic system includes a material handling robot having an end effector in the form of a multi-fingered gripper, a 3D point cloud camera operable to collect and output a data file having 2D data in the form of RGB color image data, and 3D point cloud depth data, and a controller in communication with the point cloud camera and robot. The controller includes a processor and memory on which is recorded instructions for locating a target box. Execution of the instructions by the processor causes the controller to receive the data file from the 3D point cloud camera, receive a set of input criteria, including a length, a width, a height, and/or a color of the target box, and detect a plurality of 2D line segments and a plurality of 3D line segments in the received data file. The controller also preprocesses the received image data file via a low pass filter in this embodiment to remove signal noise from the data file prior to detecting the 2D and 3D line segments, and generates a set of 3D lines, including back-projecting, via a best-fit statistical process, at least some of the 2D line segments onto at least some of the 3D line segments.

The controller in this embodiment is also configured to group the generated set of 3D lines into groups of intersecting lines, perform an NVG function on the groups of intersecting lines to identify a set of candidate planes, identify sets of intersecting planes from the set of candidate planes, and identify candidate boxes from the sets of intersecting planes. Thereafter, the controller locates a target box from among the identified candidate boxes via the input criteria and commands a grasping of the located target box by the gripper of the robot.

The above features and advantages and other features and advantages of the present invention are readily apparent from the following detailed description of the best modes for carrying out the invention when taken in connection with the accompanying drawings.

DETAILED DESCRIPTION

Figure 1:
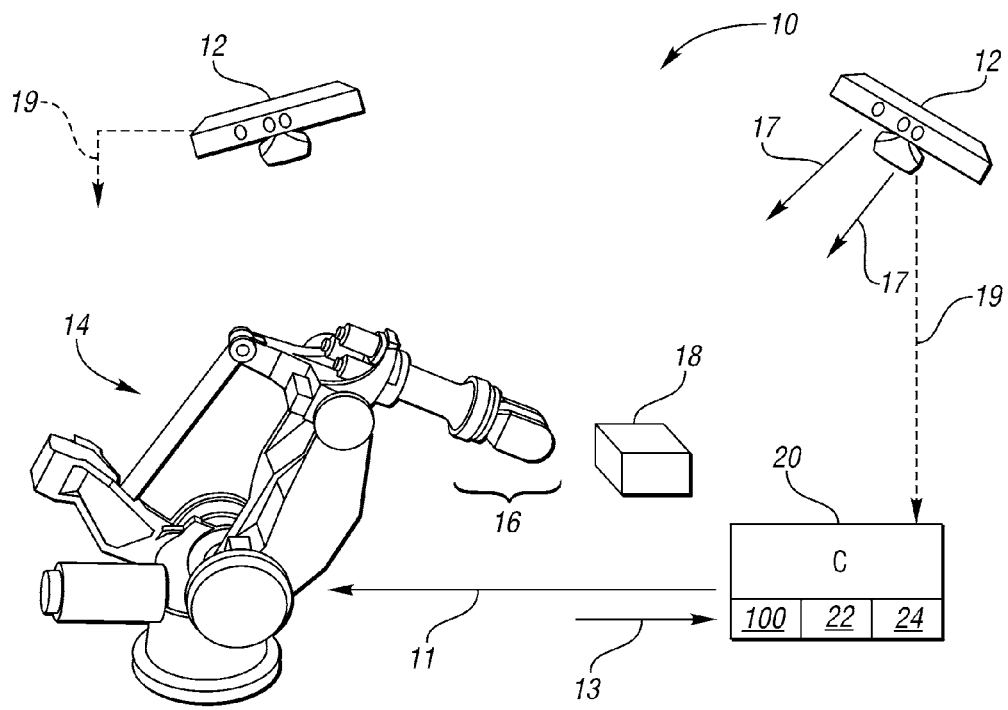
FIG. 1 is a schematic illustration of an example embodiment of a robotic system with three-dimensional (3D) box location functionality as set forth herein.

With reference to the drawings, wherein like reference numbers refer to the same or similar components throughout the several views, and beginning with FIG. 1, a robotic system 10 is shown having one or more three-dimensional (3D) point cloud cameras 12, also referred to as red, green, blue depth (RGB-D) cameras, a robot 14 having joints 15 and an end effector 16, and a controller (C) 20. The controller 20, which is in communication with the robot 14 and the camera(s) 12, is programmed to automatically locate and identify a 3D target object in the form of a box 18 via execution of instructions embodying a method 100, an example of which is described below with reference to FIG. 2. The robotic system 10 may use various other sensors in the performance of its assigned work tasks. While omitted from FIG. 1 for simplicity, example sensors may include limit switches, proximity sensors, force or load sensors, tactile sensors, and the like.

Within the scope of the present invention, the box 18 of FIG. 1 may be any rectangular box of the type used to hold components or parts in inventory, or to transport such components in a manufacturing or warehouse facility. That is, the box 18 is defined by linear edges 21 in each of its length (L), width (W), and height (H) dimensions. Such conventional boxes 18 may be stacked, clustered, or grouped, or they may be located individually throughout a given facility. In order to enable the robot 14 to perform a desired control action on the box 18, such as grasping and/or moving the box 18 and/or any of its contents via the end effector 16, the robot 14 must first be able to locate and identify the box 18 from among the potential signal noise presented by workers, machinery, and equipment in a typical plant.

Typical vision systems and high-resolution imaging devices may be used to locate objects in a facility. However, such approaches may be less than desirable due to the high relative cost of hardware, image processing complexity, and the need to explicitly train the vision system with an extensive library of training images. The present invention is intended to avoid explicit vision system training by simply specifying dimensions and/or color of a target box to be located by the robot 14. The target boxes can be located robustly in a real-time application by fusing 2D and 3D information from the 3D point cloud cameras 12. The present approach takes advantage of relative strengths of both types of images as set forth below. To further reduce cost, the 3D point cloud cameras 12 may be embodied as relatively inexpensive gaming cameras of the type known in the art, and thus the cost to implement the present approach may be attractive relative to existing machine learning techniques, e.g., neural networks, support vector machines, and the like.

The robot 14 of FIG. 1 may be embodied as a material handling robot having, as the end effector 16, an actuatable gripper suitable for grasping or picking up the box 18 once the box 18 has been located and correctly identified as a target box. By way of example, the robot 14 may be constructed as a typical 6-axis industrial robot responsive to a set of input commands (arrow 11) from the controller 20. The input commands (arrow 11) may be embodied as force, impedance, and/or position commands, or any other suitable commands, which ultimately maneuver the end effector 16 into proximity and contact with the box 18. Although omitted for simplicity, each joint 15 of the robot 14 may be driven by one or more joint actuators, e.g., ball-and-screw joint motors, linear actuators, rotary actuators, or the like, as is well understood in the art.

The controller 20 of FIG. 1 may be embodied as one or more computer devices having a processor (P) 22 and tangible, non-transitory memory (M) 24 on which is recorded instructions for executing the method 100. The memory 24 may include magnetic or optical memory, electrically-erasable programmable read only memory (EEPROM), and the like. Additional transitory memory may be included as needed, e.g., random access memory (RAM), memory for internal signal buffers, etc. Other hardware of the controller 20 may include a high-speed clock, analog-to-digital (A/D) circuitry, digital-to-analog (D/A) circuitry, and any required input/output (I/O) circuitry and devices, as well as signal conditioning and buffer electronics. Individual control algorithms resident in the controller 20 or readily accessible by the controller 20 may be stored in memory 24 and/or other suitable memory, and automatically executed via the processor 22 to provide the required control functionality.

Still referring to FIG. 1, the 3D point cloud cameras 12 are operable for imaging the box 18 whenever the box 18 is positioned in a field of view 17 of the cameras 12, and to transmit collected cloud data (arrow 19) of the box 18 back to the controller 20 for processing according to the method 100. As is known in the art, a 3D point cloud is a set of data points in a 3D coordinate system, such as the X, Y, Z Cartesian coordinate system. Such cameras are able to capture any number of data points describing the surface contour of a target object, and to output the collected point cloud data (arrow 19) as a depth data file with synchronized color data. The controller 20 may receive predetermined target information (arrow 13) defining the known size, shape, color, and/or other descriptive parameters of the particular target box to be located by the robot 14.

Thus, the controller 20 shown in FIG. 1 is made aware of the dimensions, color, and/or other identifying features of the target box it is attempting to locate for before processing of the collected point cloud data (arrow 19) from the 3D point cloud camera(s) 12. While two 3D point cloud cameras 12 are shown in FIG. 1 for illustrative simplicity, the present method 100 may work with only one 3D point cloud camera 12, or with any other number of 3D point cloud cameras 12. Non-limiting example 3D point cloud cameras 12 may have an example 2D resolution of 640×480 pixels for up to 30 frames per second, or 1280×960 resolution for up to 12 frames per second. The 3D point cloud cameras 12 may have example 3D point accuracy and depth sensing resolution of about 0.3 mm at a distance of 1 m from the target object, and may be positioned from about 0.5 to 1.5 m from the imaged target object. Other camera configurations may be used without departing from the intended inventive scope, provided the collected point cloud data (arrow 19) includes 2D color image and 3D depth data, and is auto-synchronized. As is known in the art, the term "auto-synchronize" refers to the time synchronization of the collected 2D data with the 3D data in the same collected point cloud data (arrow 19 of FIG. 1).

Figure 2:
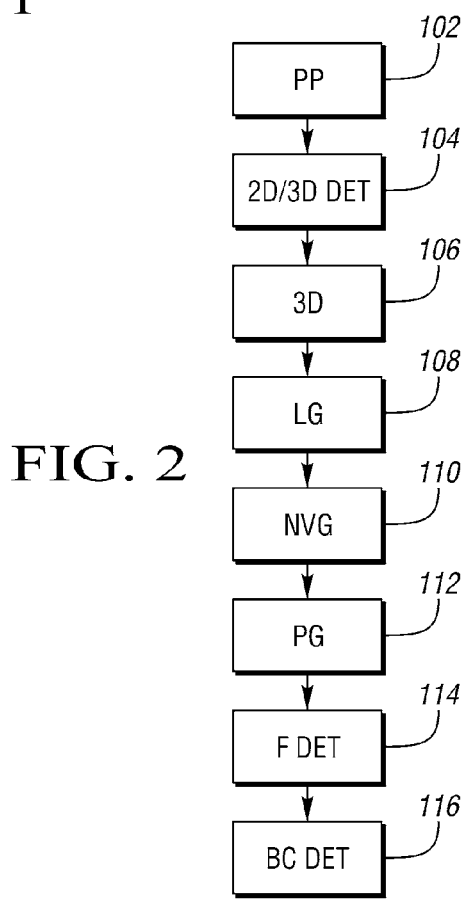
FIG. 2 is a flow chart describing a method of locating and identifying a target box via the robotic system shown in FIG. 1.

Referring to FIG. 2, an example embodiment of the method 100 begins with step 102, wherein the collected point cloud data (arrow 19 of FIG. 1) is received and preprocessed. The point cloud data contains both 2D color (RGB) data as well as 3D position data, e.g., with each data point in the point cloud having X, Y, and Z coordinates. The point cloud cameras 12 are auto-synchronized, which as is known in the art refers to the time synchronization of the collected 2D data with the 3D data in the same collected point cloud data (arrow 19 of FIG. 1). The term "preprocessing" refers to known image processing techniques such as image smoothing and edge enhancement. Smoothing and enhancement may entail suppressing high and/or low frequency noise in a collected image, such as by filtering out a particular frequency band using a band pass filter and the like.

At step 104, the controller 20 next performs a sequence of 2D/3D line detection from the preprocessed images of step 102. Various methods are known in the art for detecting linear features in an image. Such approaches are typically used in computer vision, image segmentation, and pattern recognition. Non-limiting example line detection processes include the Hough transform or the Fast Hough transform.

At step 106, the controller 20 of FIG. 1 fuses the 2D and 3D lines previously detected in step 104. As noted above, the type of camera used for the point cloud cameras 12 of FIG. 1 are 3D point cloud cameras, devices which output 2D data as an RGB image and corresponding 3D points describing XYZ or other 3D positions in free space. 2D data is more precise relative to 3D data, but with 2D data, one does not know precisely where in free space a collected 2D data point is located. On the other hand, 3D data provides the missing location information, but this additional information is less precise relative to the 2D data. Step 106 therefore includes fusing these different pieces of data for the same target.

Figure 3:
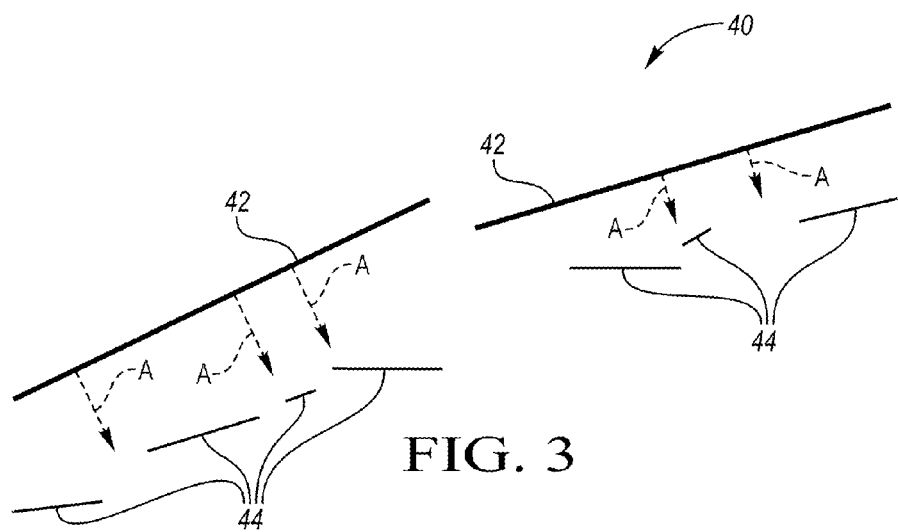
FIG. 3 is a schematic illustration of a 3D line fusing task that fuses or correlates 2D and 3D line segments as part of the method shown in FIG. 2.

Referring briefly to FIG. 3, an example set of lines 40 output from step 104 includes 2D line segments 42 representing the detected 2D lines and 3D line segments 44 representing the 3D point cloud data from the same auto-synchronized image data file from the 3D point cloud cameras 12 of FIG. 1. Step 106 of FIG. 2 may include back-projecting the 2D data into 3D space, as indicated by arrows A. Relative to 2D data, 3D data is generally noisy and less accurate, and thus is discontinuous. That is, after line detection occurs in step 104, gaps may still exist in the 3D data, as depicted by the spacing between the separate 3D segments 44. The data from the 2D line segments 42 may be back-projected to the 3D space by the controller 20 of FIG. 1 to fill in the gaps in the 3D line segments 44, for instance using a best-fit statistical approach. Step 106 generates a set of new 3D lines, which may connect previously segmented 3D line segments that correlate with one or more 2D line segments. After this occurs, the 2D line information from step 104 may be discarded. The method 100 then proceeds to step 108.

Step 108 of FIG. 2 may entail performing a line grouping function via the controller 20 of FIG. 1 so as to determine how or whether the new 3D lines from step 106 intersect. If the lines intersect at a point P, the lines are grouped as potential candidate line groups, i.e., LG=(L1, L2, P), where LG represents a given candidate line group, L1 represents one line in the candidate group, L2 is an intersecting line in the same group, and P is a point of intersection in 3D space of lines L1 and L2.

Figure 4:
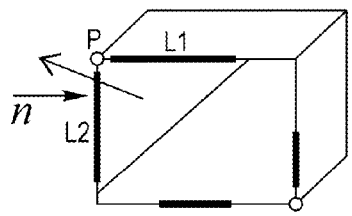
FIG. 4 is a schematic illustration of a line grouping task of the method of FIG. 2.

Referring briefly to FIG. 4, in order to perform step 108, the controller 20 of FIG. 1 may calculate a normal vector (n) for each intersecting line pair (L1, L2, P). Other candidate lines are represented as $L_C$. All line segments may be extended as needed so as to find the intersection point P. The normal vector (n) may be calculated as the cross product of lines L1 and L2, i.e., n=L1×L2, as is well known in the art. Thus, the output of step 108 is a set of normal vectors (n).

Step 110 of FIG. 2 includes performing a Normal Vector Grouping (NVG) process. Known NVG processes are based on the fact that 3D points located on a common plane will have similar normal vectors (n). NVG thus uses the IJK space, which as known in the art is another 3D coordinate space that is perpendicular to the XYZ space, to determine which normal vectors (n) from step 108 point in the same direction. The more concentrated a collection of normal vectors, the more likely that the vectors originate from the same flat or planar surface of interest.

Such a surface may be a rectangular surface of the target box that the robot 14 of FIG. 1 is attempting to locate as part of the method 100. Thus, step 110 outputs a set of candidate planes by grouping a set of vectors $N_i$ of k intersecting pairs, i.e., $N_i=\{(L1, L2, P) k\}$. The method 100 proceeds to step 112 once the set of candidate planes has been determined.

Figure 5:
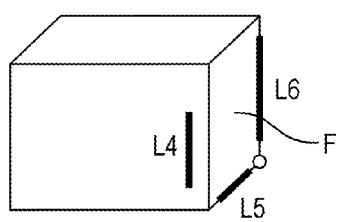
FIG. 5 is a schematic illustration of deficient plane grouping task of the method shown in FIG. 2.

At step 112, referring to FIG. 5, the controller next groups planes from the candidate planes of step 110 into a plane grouping (PG) or a deficient plane grouping (DPG). In the plane grouping, the group is described as PG=(L1, L2, L3, L4, n). If two orthogonal sets are identified with the same normal vector (n) and the same phase, this describes a single plane. In the deficient plane grouping, the group may be described as DPG=(L4, L5, L6, n), i.e., fewer than four lines are present for a possible face (F). Something less than a full plane is thus described, in this particular case by intersecting line segments (L5, L6) and line segment L4, all of which may or may not actually be in the same plane. However, such possible/candidate planes may still be useful and valid, and therefore may be considered by the controller 20 of FIG. 1 as supplemental information to help identify a given target box.

Figure 6:
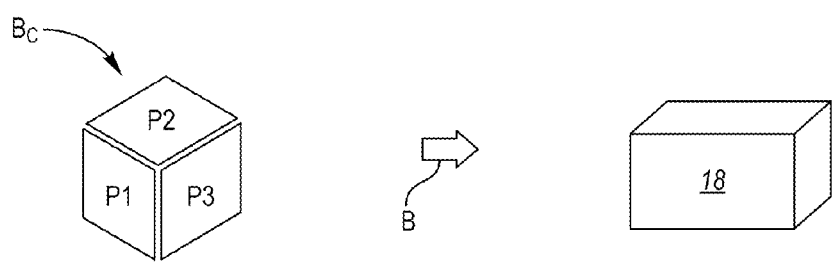
FIG. 6 is a schematic illustration of possible box construction decisions of the controller shown in FIG. 1.

Step 114 includes constructing boxes from the candidate planes as determined at step 112. The controller 20 may determine from the plane groupings (PG) of step 112 whether three planes (P1, P2, P3), as shown in FIG. 6, have been identified that are arranged at right angles to each other, i.e., in the form of a typical rectangular box. Step 114 may include grouping planes into different candidate boxes with three planes, two planes, and one plane. Once so grouped, the method 100 proceeds to step 116.

At step 116 of FIG. 2, the controller 20 of FIG. 1 next makes a decision as to the boxes of step 114. A candidate box ($B_C$) having three planes (P1, P2, P3) is shown in FIG. 6. Such a candidate box ($B_Q$) has a strong likelihood of being a true rectangular box. Even if there are only two planes arranged at right angles, for example planes P1 and P2, this information may still suggest a strong candidate box, as some additional dimensional data is provided in the form of depth. If only one plane (P1, P2, or P3) is identified, this makes a poor candidate box relative to a candidate box having two or three planes, as depth information is not provided via a single plane. However, a single plane identification can still be useful to the controller 20 of FIG. 1, for instance by matching known distances between vertices to predetermined size criteria for the particular target box that is being located.

As part of step 116, the controller 20 of FIG. 1 may locate a target box from among the identified candidate boxes via input criteria such as the predetermined target information (arrow 13 of FIG. 1). For example, if the predetermined target information is a box having dimensions of 0.5 m per side, the controller 20 can compare the dimensions of the candidate box ($B_e$) to this information to determine if the dimensions sufficiently match. Color is another possible comparison standard.

When a match is detected, the controller 20 may command execution of a control action on the target box, e.g., box 18 of FIG. 1, by the end effector 16 of the robot 14 shown in FIG. 1. Example control actions may include commanding the robot 14 to clamp the end effector 16 onto the box 18 via transmission of the input commands (arrow 11 of FIG. 1) to the actuators of the joints 15 shown in the same Figure. In this manner, the box 18, once properly identified as a target box using the method 100 described above, can be acted on by the robot 14.

While the best modes for carrying out the invention have been described in detail, those familiar with the art to which this invention relates will recognize various alternative designs and embodiments for practicing the invention within the scope of the appended claims.

The invention claimed is:

1. A robotic system comprising:
   a robot having an end effector;
   a three-dimensional (3D) point cloud camera operable to collect and output an image data file having two-dimensional (2D) color data and 3D depth data; and
   a controller in communication with the camera and the robot, and having a processor and memory on which is recorded instructions for locating a target box, wherein execution of the instructions by the processor causes the controller to:
      receive the image data file from the camera;
      receive a set of input criteria;
      detect a plurality of 2D line segments and a plurality of 3D line segments in the received image data file;
      generate a set of new 3D lines, including back-projecting at least some of the 2D line segments onto at least some of the 3D line segments;
      group the generated set of new 3D lines into groups of intersecting lines;
      perform a normal vector grouping function on the groups of intersecting lines to identify a set of candidate planes;
      identify sets of intersecting planes from the identified set of candidate planes;
      identify candidate boxes from the identified sets of intersecting planes;
      locate the target box from among the identified candidate boxes using the input criteria; and
      command an execution of a control action on the target box by the end effector of the robot.

2. The robotic system of claim 1, wherein the 2D color data is red, green, and blue (RGB) color data.

3. The robotic system of claim 1, wherein the controller is configured to preprocess the received image data file to remove signal noise from the image data file prior to detecting the 2D and 3D line segments.

4. The robotic system of claim 1, wherein the robot is a material handling robot and the end effector is a multi-fingered gripper.

5. The robotic system of claim 1, wherein the input criteria includes at least one of a length, a width, a height, and a color of the target box.

6. The robotic system of claim 1, wherein the controller is configured to execute a best-fit statistical process to back-project the 2D line segments onto the 3D line segments.

7. A method for use with a robotic system, the method comprising:
   receiving a set of input criteria via a controller of the robotic system;
   receiving, via the controller, an image data file from a three-dimensional (3D) point cloud camera of the robotic system, wherein the image data file includes two-dimensional (2D) color data and 3D depth data;
   detecting a plurality of 2D line segments and a plurality of 3D line segments in the received image data file;
   generating a set of new 3D lines, including back-projecting at least some of the 2D line segments onto at least some of the 3D line segments;
   grouping the generated set of new 3D lines into groups of intersecting lines;
   performing a normal vector grouping function on the groups of intersecting lines to thereby identify a set of candidate planes;
   identifying sets of intersecting planes from the set of candidate planes;
   identifying candidate boxes from the identified sets of intersecting planes;
   locating, via the controller, a target box from among the identified candidate boxes using the input criteria; and
   commanding, via the controller, an execution of a control action on the target box by an end effector of a robot of the robotic system.

8. The method of claim 7, further comprising executing the control action via the end effector, including grasping the target box via the end effector.

9. The method of claim 7, wherein the 2D color data is red, green, blue (RGB) color image data.

10. The method of claim 7, further comprising preprocessing the image data file via the controller to remove signal noise from the image data file prior to detecting the 2D and 3D line segments.

11. The method of claim 7, wherein the robot is a material handling robot and the end effector is a multi-fingered gripper.

12. The method of claim 7, wherein receiving the input criteria includes receiving at least one of a length, a width, a height, and color of the target box.

13. The method of claim 7, wherein generating the set of new 3D lines includes back-projecting at least some of the 2D line segments onto at least some of the 3D line segments via a best-fit statistical function.

14. A robotic system comprising:
   a material handling robot having an end effector in the form of a gripper;
   a three-dimensional (3D) point cloud camera operable to collect and output an image data file having two-dimensional (2D) data in the form of red, green, blue (RGB) color image data, and 3D depth data; and
   a controller in communication with the 3D point cloud camera and the robot, and having a processor and memory on which is recorded instructions for locating a target box, wherein execution of the instructions by the processor causes the controller to:
      receive the image data file from the point cloud camera;
      receive a set of input criteria, including at least one of a length, a width, a height, and a color of the target box;
      detect a plurality of 2D line segments and a plurality of 3D line segments in the received image data file;

preprocess the received image data file via a low pass filter to remove signal noise from the image data file prior to detecting the 2D and 3D line segments;

generate a set of new 3D lines, including back-projecting, via a best-fit statistical process, at least some of the 2D line segments onto at least some of the 3D line segments;

group the generated set of new 3D lines into groups of intersecting lines;

perform a normal vector grouping function on the groups of intersecting lines to thereby identify a set of candidate planes;

identify sets of intersecting planes from the set of candidate planes;

identify candidate boxes from the identified sets of intersecting planes;

locate a target box from among the identified candidate boxes via the input criteria;

command a grasping of the located target box by the gripper of the robot.

* * * * *